Figure 1:
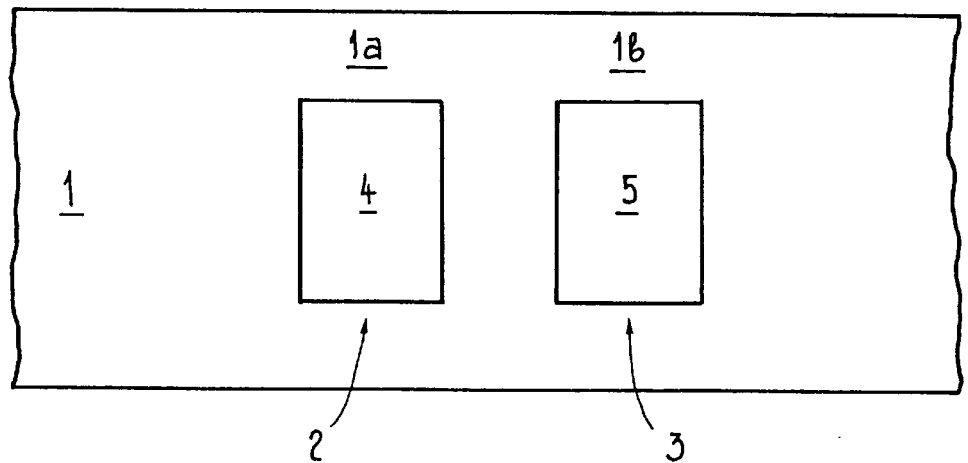

United States Patent [19]
Hunkeler

[11] Patent Number: 6,103,040
[45] Date of Patent: Aug. 15, 2000

[54] PROCESS FOR PRODUCING PRODUCTS HELD ON A CARRIER, SUCH AS PACKAGED PRODUCT SAMPLES, CREDIT CARDS, IDENTIFICATION CARDS AND ID CARDS

[75] Inventor: Franz Hunkeler, Zofingen, Switzerland

[73] Assignee: Hunkeler AG Papierverarbeitungsmaschinen, Wikon, Switzerland

[21] Appl. No.: 08/930,179

[22] PCT Filed: Apr. 15, 1996

[86] PCT No.: PCT/CH96/00133

§ 371 Date: Oct. 20, 1997

§ 102(e) Date: Oct. 20, 1997

[87] PCT Pub. No.: WO96/34808

PCT Pub. Date: Nov. 7, 1996

[30] Foreign Application Priority Data

May 4, 1995 [CH] Switzerland ............... 1287/95

[51] Int. Cl.[7] .............. B32B 31/00; B32B 31/10; B65D 75/28; B42D 15/10
[52] U.S. Cl. ............... 156/226; 156/252; 156/253; 156/256; 156/290; 156/291; 206/823; 283/106; 428/43; 428/195; 428/201; 428/905
[58] Field of Search ................. 156/227, 252, 156/253, 256, 277, 290, 291, 226; 428/40.1, 40.2, 42.1, 42.2, 42.3, 195, 201, 905, 43; 283/74, 75, 94, 101, 105, 106; 206/823

[56] References Cited

U.S. PATENT DOCUMENTS

| | | |
|---|---|---|
| 3,855,033 | 12/1974 | Staats . |
| 4,145,001 | 3/1979 | Weyenberg et al. ............ 428/905 X |
| 4,484,768 | 11/1984 | Norfleet ............ 428/905 X |
| 4,805,773 | 2/1989 | Sabongi . |
| 4,876,136 | 10/1989 | Chang et al. . |
| 4,889,749 | 12/1989 | Ohashi et al. . |
| 4,889,755 | 12/1989 | Charbonneau ............ 428/905 X |
| 4,892,335 | 1/1990 | Taft . |
| 4,923,063 | 5/1990 | Tararuj . |
| 4,941,574 | 7/1990 | Meehan . |
| 5,050,910 | 9/1991 | Schechter et al. ............ 428/905 X |
| 5,188,236 | 2/1993 | Sayers et al. . |
| 5,248,537 | 9/1993 | Giannavola ............ 428/905 X |
| 5,368,581 | 11/1994 | Smith et al. . |
| 5,389,174 | 2/1995 | Hibsch et al. ............ 283/106 X |
| 5,445,821 | 8/1995 | Brown et al. . |
| 5,609,710 | 3/1997 | Charbonneau ............ 156/276 |
| 5,611,972 | 3/1997 | Tararuj et al. ............ 428/201 X |
| 5,645,161 | 7/1997 | Whitaker et al. ............ 428/905 X |
| 5,690,130 | 11/1997 | Gunderman et al. ............ 206/823 X |
| 5,705,243 | 1/1998 | Mehta et al. ............ 428/40.1 X |
| 5,715,849 | 2/1998 | Vanbraekel ............ 206/823 X |

FOREIGN PATENT DOCUMENTS

| | | |
|---|---|---|
| 263327 | 4/1988 | European Pat. Off. . |
| 2-254045 | 9/1992 | United Kingdom . |
| 2-269340 | 2/1994 | United Kingdom . |
| 2-272667 | 5/1994 | United Kingdom . |
| WO 92/14607 | 9/1992 | WIPO . |
| WO 93/24031 | 12/1993 | WIPO . |
| WO 94/05182 | 3/1994 | WIPO . |

*Primary Examiner*—Curtis Mayes
*Attorney, Agent, or Firm*—Oliff & Berridge, PLC

[57] ABSTRACT

For forming a packaged product sample held in a carrier material (1), in a first operation two sections of material (8, 9), for example sections of film, are applied next to each other to the same side of the carrier material (1). Then, the product sample (10) is applied to one section of material (8). Subsequently, by folding the carrier material (1) about a folding line (11), the other section of material (9) is placed over the section of material (8) carrying the product sample (10). Subsequently, the two sections of carrier material (1a, 1b) lying one over the other and carrying the sections of material (8, 9) are joined to each other, to be precise along a closed region surrounding the product sample (10). In order to be able to remove the product sample, within the joining region between the two sections of carrier material (1a, 1b) there is provided a line of weakness which defines a tear-open part.

24 Claims, 5 Drawing Sheets

PROCESS FOR PRODUCING PRODUCTS HELD ON A CARRIER, SUCH AS PACKAGED PRODUCT SAMPLES, CREDIT CARDS, IDENTIFICATION CARDS AND ID CARDS

The present invention relates to a process for producing products held on a carrier, such as packaged product samples, credit cards, identification cards, ID cards and the like, and also the products produced by this process.

Various processes for producing packaged product samples, for example perfume, which are integrated in a carrier are known (see for example WO-A94/05182).

These carriers with the packaged product samples are then, for example, placed, stapled or stuck into newspapers, periodicals and advertising material.

Furthermore, it is likewise known to integrate credit cards, ID cards and identification cards into a carrier in such a way that the cards can be broken out.

The present invention is thus based on the object of providing a process of the type mentioned at the beginning which makes it possible in a simple and inexpensive way to produce products integrated into a carrier.

Figure 2:
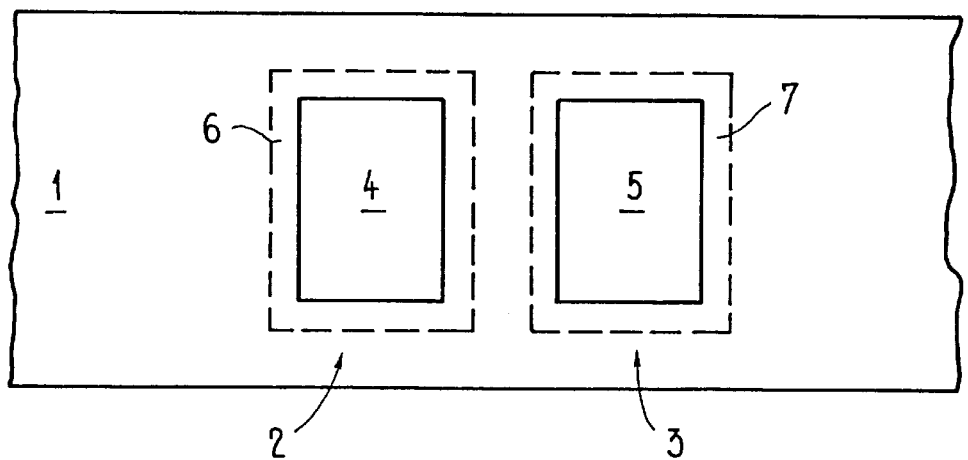
Figure 3:
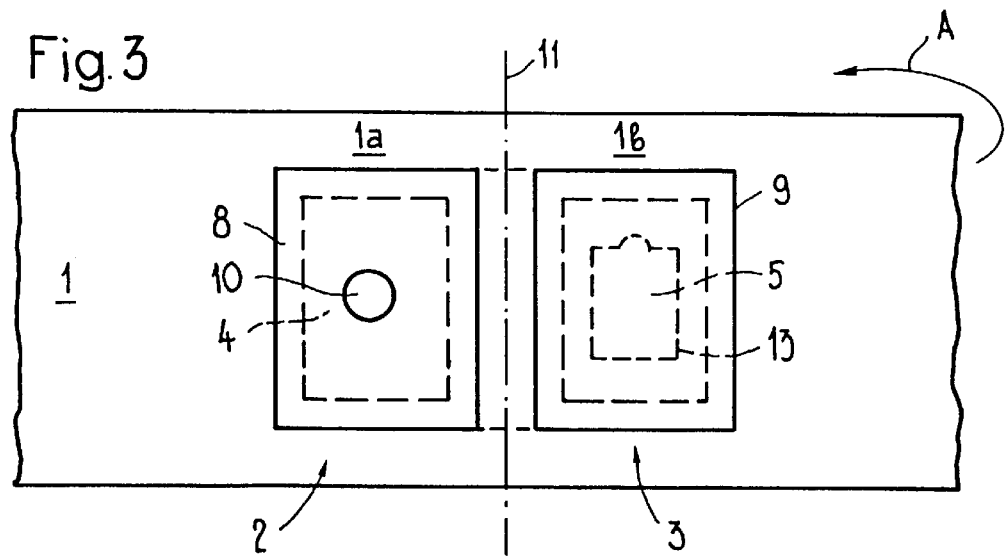
Figure 4:
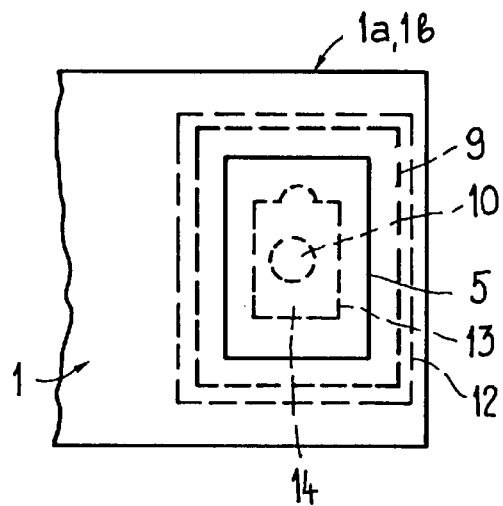
Figure 5:
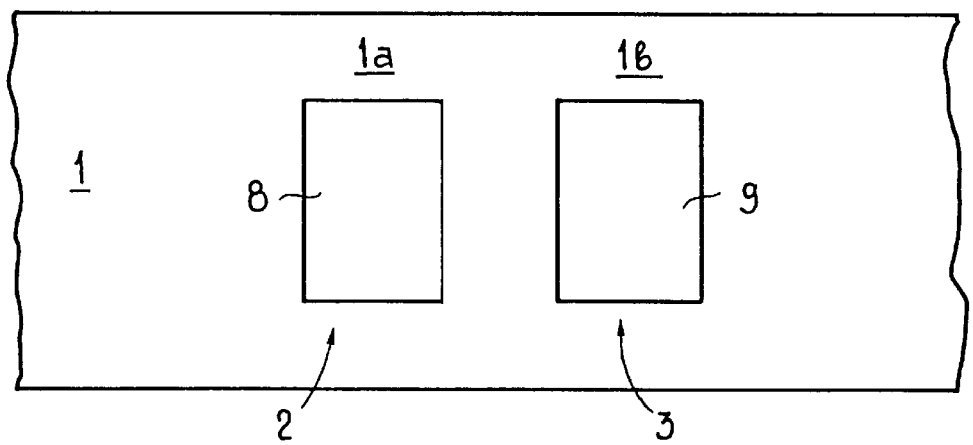
Figure 6:
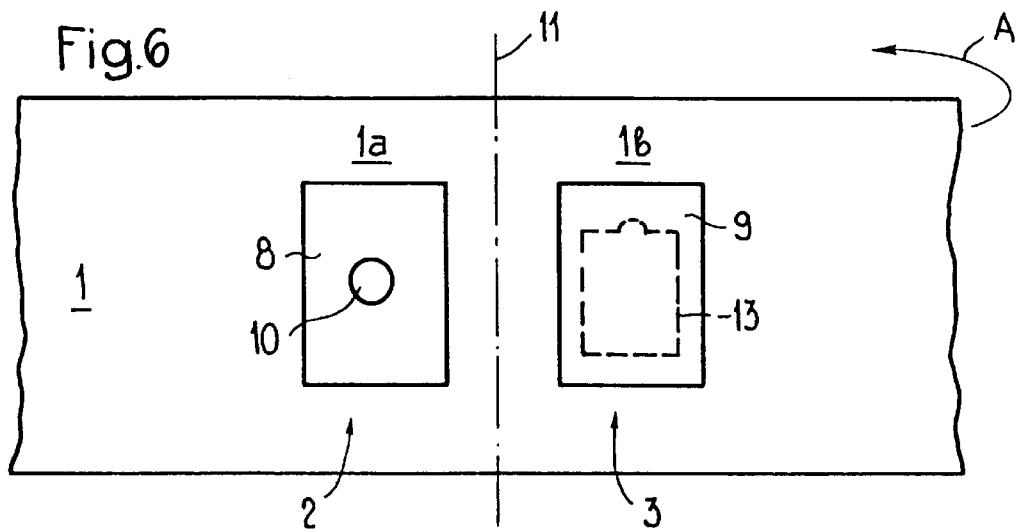
Figure 7:
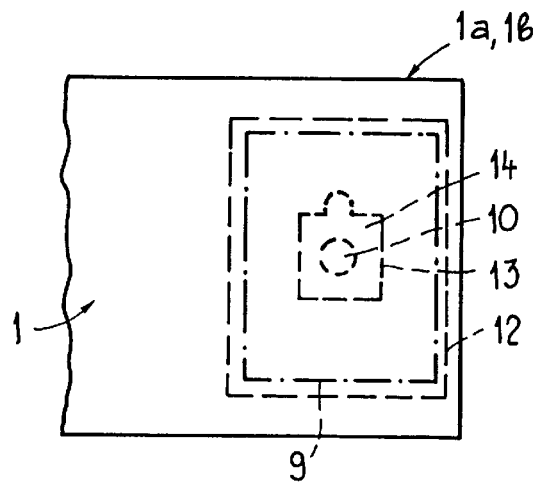
Figure 8:
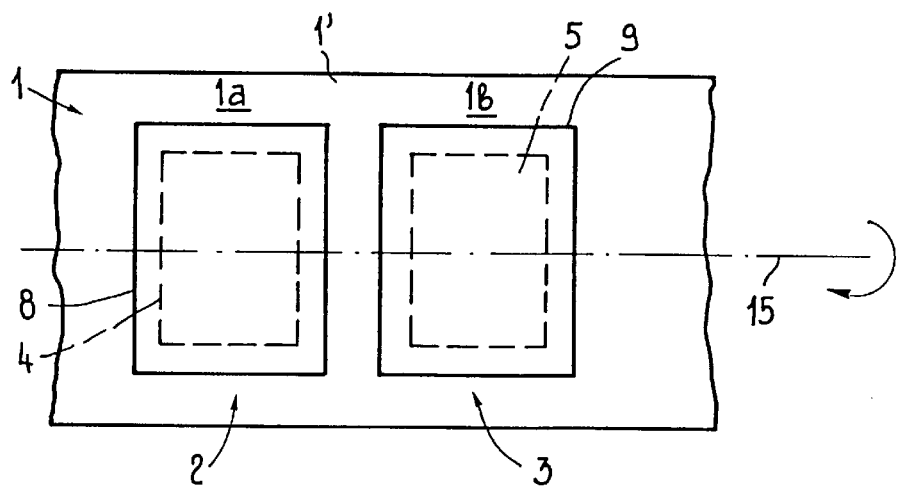
Figure 9:
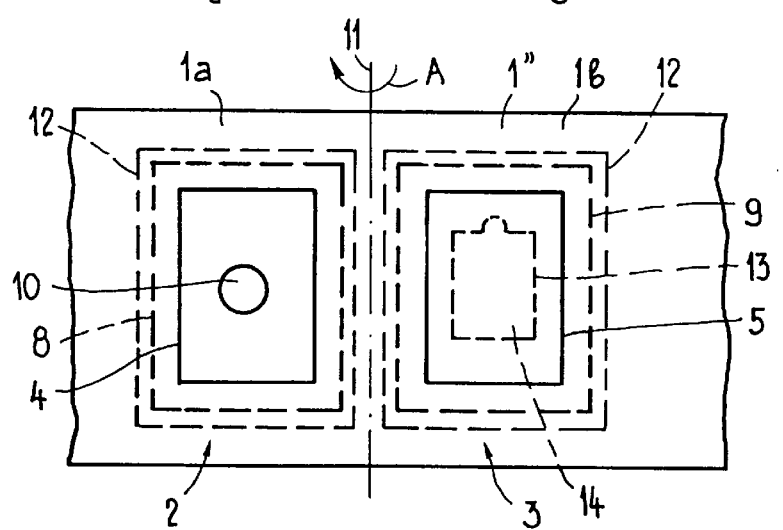
Figure 10:
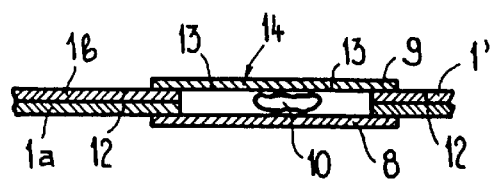
Figure 11:
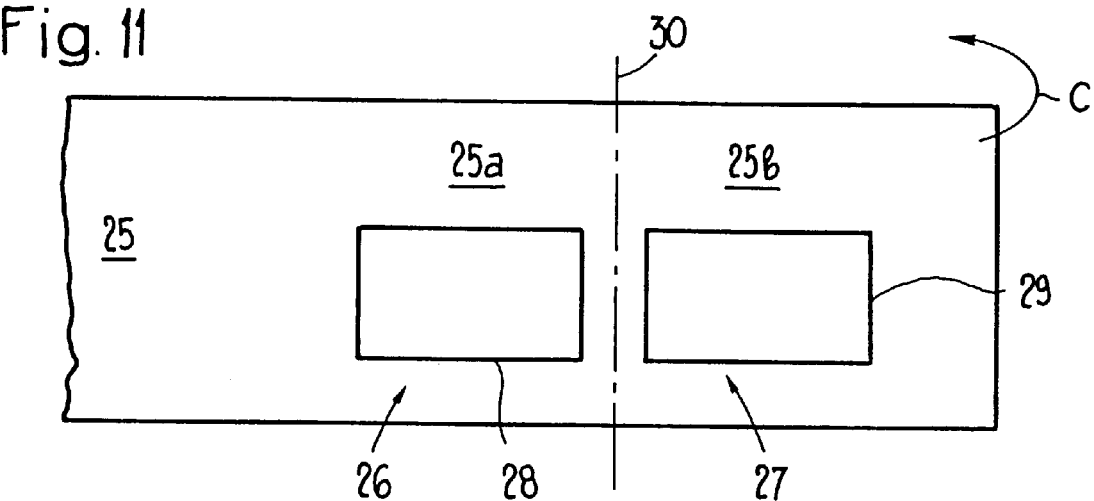
Figure 12:
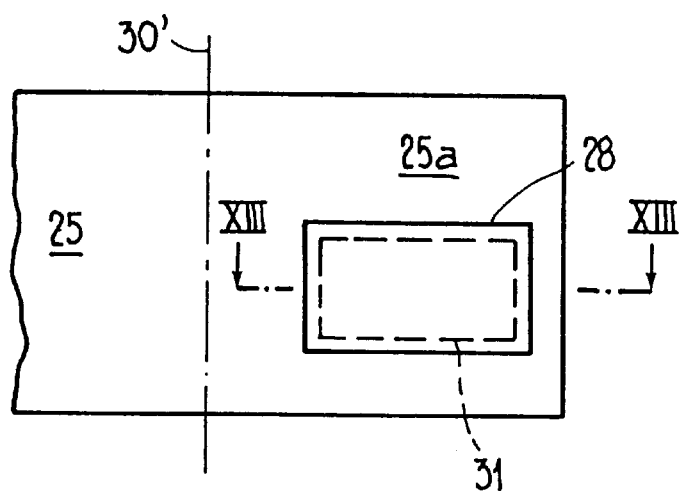
Figure 13:
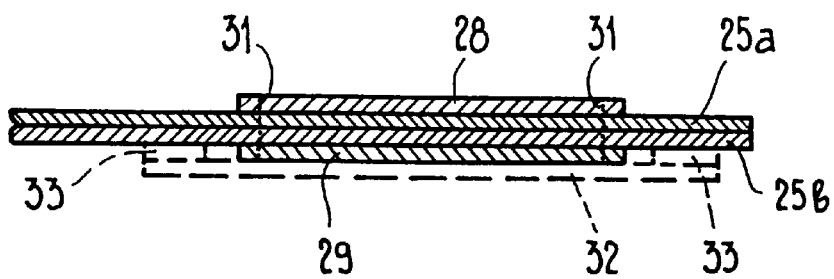
Figure 14:
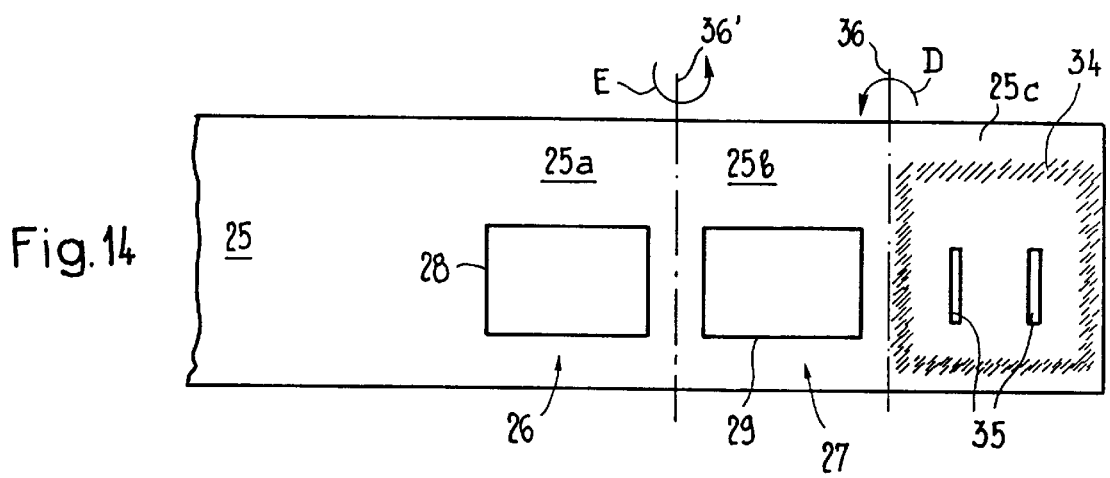
Figure 15:
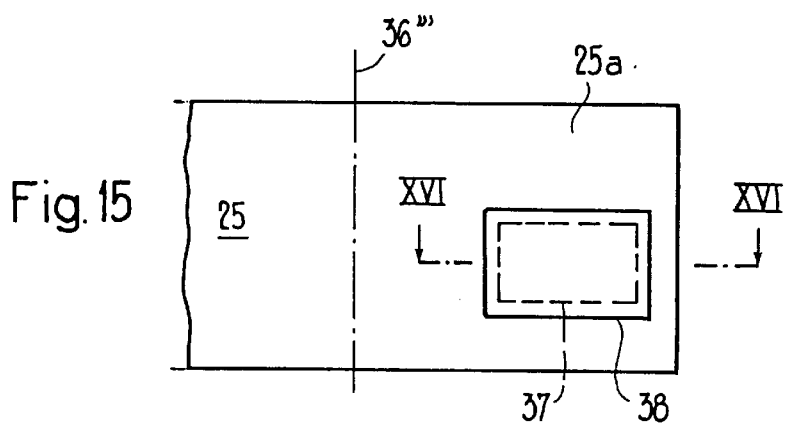
Figure 16:
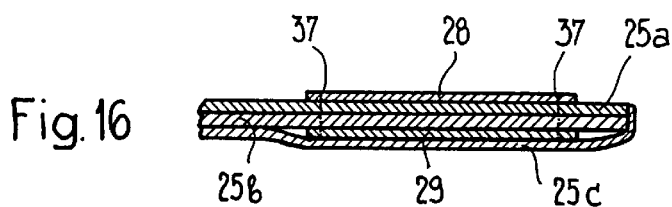
Figure 17:
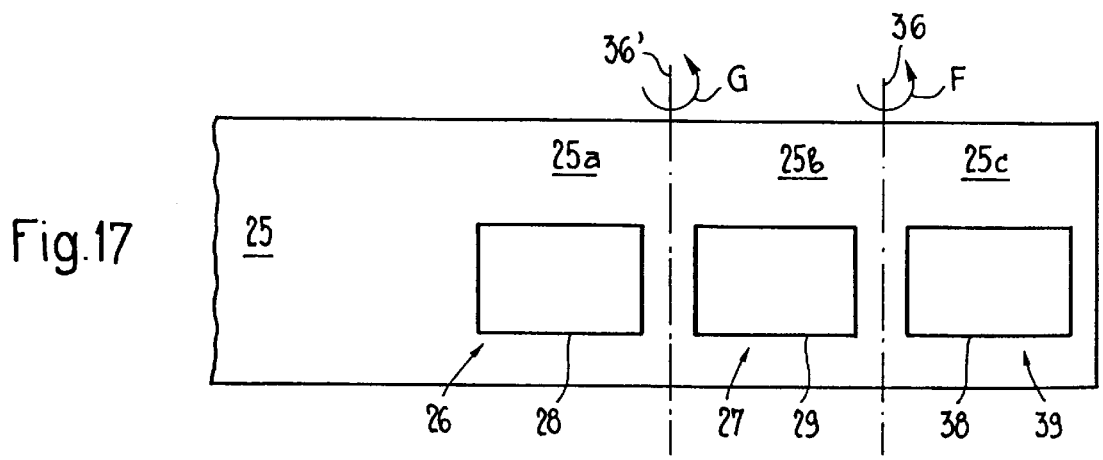

The process according to the invention is explained in more detail below with reference to the figures, in which, purely schematically:

FIGS. 1–4 show in plan view various phases in the production of a first embodiment of a packaged product sample, integrated in a carrier material, FIGS. 5–7 show in a representation corresponding to FIGS. 1–4 various phases in the production of a second embodiment of a packaged product sample, integrated in a carrier material, FIGS. 8 and 9 show in a representation corresponding to FIGS. 2 and 3 various phases in the production of a third embodiment of a packaged product sample, integrated in a carrier material, FIG. 10 shows on an enlarged scale a section through the product sample produced as shown in FIGS. 8 and 9, FIGS. 11 and 12 show in plan view various phases in the production of a first embodiment of a card integrated in a carrier material, FIG. 13 shows a section along the line XIII—XIII in FIG. 12, FIGS. 14 and 15 show in a representation corresponding to FIGS. 11 and 12 various phases in the production of a second embodiment of a card integrated in a carrier material, FIG. 16 shows a section along the line XVI—XVI in FIG. 15, and FIG. 17 shows in a representation corresponding to FIG. 14 a phase in the production of a third embodiment of a card integrated in a carrier material.

In the production of a first embodiment of a packaged product sample integrated in a carrier material 1 (FIGS. 1–4), in a first step, two adjacent regions 2,3 are prepared in two sections 1a, 1b of the carrier material 1, which may be a sheet or a web of paper or plastic. In a first operation, two openings 4 and 5 are punched out in these regions 2 and 3 (FIG. 1). Subsequently, an adhesive is applied in regions 6 and 7, respectively, surrounding the openings 4 and 5 (FIG. 2). Then, a section of material 8, 9, for example a section of film, is placed over each opening 4, 5 and adhesively attached to the carrier material 1 in the region 6 and 7, respectively, provided in advance with an adhesive (FIG. 3). The sections of material 8 and 9 may be transparent or opaque and, if appropriate, also bear printing.

The product sample 10 is then applied in liquid or solid form, as a paste, powder or granules, to one of the two sections of material 8, 9, in the present case to the section of material 8. In the next step, by folding over the section of carrier material 1b in the direction of arrow A about the line denoted by 11, the section of material 9 is placed onto the section of material 8 lying opposite with respect to the folding line 11. In the regions 2 and 3 lying one over the other, the sections of carrier material 1a, 1b are bonded to each other in such a way that a seal is formed around the product sample 10. This may be performed by adhesive bonding and/or stamping or in some other suitable way. The packaged product sample 10 is then packaged between the sections of material 8 and 9 and is integrated in the carrier material 1.

If one of the two sections of material 8, 9 is transparent, the product sample 10 can be seen.

In order to be able to break the packaged product sample out from the carrier material 1, a line of weakness 12, for example a perforated line or a punched line, is provided, as shown in FIG. 4, outside the bonding region between the sections of material 8, 9 or the sections of carrier material 1a, 1b, and surrounding this bonding region. The latter operation may be performed before the folding over (FIG. 3) or after the folding over (FIG. 4).

In order to facilitate the opening of the packaged product sample, and consequently access to the product sample 10, there may be provided within the abovementioned bonding region, before the folding over of the section of carrier material 1b, in the section of material 9 a further line of weakness 13 (FIG. 3), by which a tear-open part 14 (FIG. 4) is defined.

Instead of folding the section of carrier material 1b about the folding line 11, as explained with reference to FIG. 3, it is also possible to place the section of material 9 onto the section of material 8 by detaching the section of carrier material 1b along the line 11 and, with the section of material 9 facing downward, placing it onto the other section of carrier material 1a.

It is also possible, moreover, to dispense with the punching out of one of the openings, for example the opening 5, and, in the corresponding region 3, to apply the section of material 9 by its full surface area to the section of carrier material 1b.

In the case of the variant shown in FIGS. 5–7, unlike in the case of the variant according to FIGS. 1–4, no openings are punched out from the sections of carrier material 1a, 1b. Rather, in a first operation, the sections of material 8, 9 are adhesively attached to the carrier material 1. Subsequently, the further process steps proceed as described with respect to FIGS. 1–4.

Instead of attaching the sections of material 8 and 9 to the carrier material 1, as described, it is also possible to prepare the regions 2 and 3 by making the carrier material impermeable to gases and liquids in these regions in some other way, for example by applying a layer of varnish or silicone.

The production of a third embodiment of a packaged product sample, which is very similar to the method of production explained with reference to FIGS. 1–4, is now explained with reference to FIGS. 8–10.

In a first operation, the openings 4, 5 are punched out from the carrier material 1. These openings are subsequently covered by means of in each case a section of material 8, 9, which is joined, preferably adhesively bonded, to the one side 1' of the carrier material 1 in a region surrounding the opening 4 or 5, respectively. Subsequently, the carrier material 1 is turned, so that the other side 1" comes to lie upward. In FIG. 8, 15 denotes the line about which the turning can be performed in the direction of arrow B.

As FIG. 9 shows, the line of weakness 13 defining the tear-open part 14 is then provided in the section of material 9 in the region of the opening 5. Already in this operation, the lines of weakness 12 may also be provided (instead of only after the folding over of the section of carrier material 1b, as described with reference to FIGS. 1–4). Subsequently, the product sample 10 is applied to the section of material 8, now located on the rear side of the carrier material 1, in the region of the opening 4. Subsequently, the section of carrier material 1b is folded over in the direction of arrow A about the folding line 11 and placed onto the section of carrier material 1a in such a way that the openings 4, 5 are aligned with respect to each other. The two sections of carrier material 1a, 1b lying one over the other are sealed to each other in a region surrounding the openings 4, 5.

As revealed by the sectional FIG. 10, for which a larger scale has been chosen for better overall clarity, in the case of this embodiment an intermediate space for the product sample 10 is formed between the two sections of material 8, 9. The size of this intermediate space is determined by the thickness of the two sections of carrier material 1a, 1b lying one on top of the other.

In the case of this third embodiment as well, the sections of material 17, 20 are preferably sections of film and may be transparent or opaque and, if appropriate, bear printing.

In the production of all three embodiments according to FIGS. 1–10, the advantage arises that the sections of material 8, 9 can be attached on the same side of the carrier material 1, at the same time or at different times. As a result, it is possible to make do with a single material-section dispensing unit, without turning of the carrier material 1 being required for applying the sections of material 8, 9.

In the case of all the embodiments shown so far, it is also conceivable to apply, instead of the two sections of material 8, 9 which are separate from each other, a single section of material which covers both regions 2, 3 and also the intermediate region between these regions 2, 3.

It is now described below with reference to FIGS. 11–13 how a card (credit card, identification card, ID card or the like) integrated in a carrier material 15 is produced.

As FIG. 11 shows, sections of material 28, 29 are applied, preferably adhesively attached, to two adjoining sections 25a, 25b of a carrier material 25, which may bear printing, in neighboring regions 26, 27. The sections of material 28, 29 are preferably sections of film, which may be transparent or opaque and, if appropriate, also bear printing. Subsequently, the section of carrier material 25b is folded over toward the rear in the direction of arrow C about the folding line 30, so that the two sections of material 28, 29 are aligned with each other, but lie on sides of the carrier material 25 facing away from each other. The two regions 26, 27 lying one over the other, or the sections of carrier material 25a, 25b (which incidentally may bear printing), are joined to each other in a suitable way, preferably adhesively bonded to each other. In order to be able to break the card out from the carrier material 25, a closed line of weakness 31 (FIG. 12), which goes through the entire sandwich construction, which can be seen in FIG. 13, is then produced. As is shown in FIG. 13, the two sections of carrier material 25a, 25b lie directly one on top of the other. On the outer sides of these sections of carrier material 25a, 25b, the sections of material 28 and 29, which cover each other, are applied. The fact that the sections of material web 25a, 25b lie one on top of the other achieves the effect of a greater thickness and stability of the card, which makes it possible to use a thinner carrier material 25.

Instead of bringing the section of carrier material 25b into contact with the section of carrier material 25a by folding back, as described, it is also possible to detach the section of carrier material 25b along the line 30 and place it onto the section of carrier material 25a from behind.

In FIG. 12, 30' indicates a further folding line, along which the sections of carrier material 25a, 25b lying one over the other can once again be folded over, toward the carrier material 25.

The line of weakness (perforated line) 31 must be formed in such a way that, although the card can be broken out, it is still held sufficiently firmly in the carrier material 25 for it not to fall out. In FIG. 13 there is depicted by dashed lines an additional covering 32, which allows the line of weakness 31 to be formed as a punched or cut line. The card is held releasably by means of a suitable adhesive on this covering 32, which is firmly joined to the section of carrier material 25b by means of an adhesive 33. This variant has the advantage that the card no longer has to be joined to the sections of carrier material 25a, 25b by means of individual joining tabs, but is detached from the sections of carrier material 25a, 25b by the forming of the line of weakness 31, formed as a punched or cut line. The card is held in the carrier material 25 by adhesive action on the covering 32. It should also be noted that the cut line 31 must not pass through the covering 32.

The process described below with reference to FIGS. 14–16 is very similar to the process as described above with reference to FIGS. 11–13.

In two adjacent regions 26, 27, likewise two sections of material 28, 29 are applied to adjoining sections 25a and 25b of the carrier material 25. The section of carrier material 25b is adjoined by a further section of material web 25c. This section of carrier material 25c is provided with two applications of adhesive 34 and 35. The application of adhesive 34 is in this case arranged and formed in such a way that, after the following placing of the sections of carrier material 25b and 25c over each other, it runs around the section of material 29. By contrast, the application of adhesive 35 is arranged and formed in such a way that, when the sections of carrier material 25b and 25c have been placed over each other, it comes into contact with the section of material 29.

As already mentioned, first of all the section of carrier material 25c provided with the applications of adhesive 34 and 35 is folded in the direction of arrow D about the line 36 and placed onto the section of carrier material 25b and joined to the latter by means of the application of adhesive 34. In a next step, the two sections of carrier material 25b and 25c lying one over the other are folded toward the rear in the direction of arrow E about the line 36' and placed onto the section of carrier material 25a. The two sections of carrier material 25a and 25b lying one against the other are joined to each other as explained with reference to FIGS. 11 and 12, preferably by adhesive bonding.

Then, a line of weakness 37, which may be formed as a punched or cut line, is provided. When doing so, it must be ensured that this line of weakness 37 does not pass through the section of carrier material 25c.

The composition of the sandwich construction created in this way can be seen from FIG. 16, in which the applications of adhesive 34 and 35 are not shown, however, for the sake of overall clarity. The card fixed by the line of weakness 37 is releasably held by means of the application of adhesive 35 on the section of carrier material 25c and, accordingly, does not have to be joined to the sections of carrier material 25a and 25b by means of joining tabs.

In FIG. 15 it is indicated by a further line 36''' that the sections of carrier material 25a, 25b and 25c lying one over the other can be folded about this folding line 36''', toward the carrier material 25.

In the case of the variant shown in FIG. 17, which has a certain similarity with that according to FIGS. 14–16, the section of carrier material 25b is likewise adjoined by a further section of carrier material 25c. In the regions 26 and 27, as in the case of the previous exemplary embodiments, sections of material 28 and 29, which lie on the outside of the finished product, are applied to the sections of carrier material 25a and 25b. Then, in the region denoted by 39, a section of material 38, which may have, for example, a printed circuit or a possibly concealed code, is likewise applied to the outermost section of carrier material 25c. The three sections of carrier material 25a, 25b and 25c are then folded one into the other in such a way that the section of material 38 comes to lie on the inside, i.e. is arranged between the sections of material 28 and 29. In order to achieve this, in a first step the section of carrier material 25c is bent over toward the rear about the line 36 in the direction of arrow F, so that it comes to bear against the rear side of the section of carrier material 25b. Subsequently, the two sections of carrier material 25b and 25c lying one against the other and preferably joined to each other by adhesive bonding are folded over again toward the rear in the direction of arrow G about the line 36', so that the two sections of carrier material 25b and 25c come to lie behind the section of carrier material 25a in the sequence section 25c and then 25b. The section of carrier material 25c is joined to the section of carrier material 25a in a suitable way, preferably likewise by adhesive bonding. Finally, in the same way as in the case of the previous exemplary embodiments, the card which can be broken out is fixed by a line of weakness 37. If appropriate, in the same way as shown in FIG. 13, there may also be provided a covering 32, which serves for the releasable holding of the card which can be broken out.

In the case of the embodiments according to FIGS. 14–17, in the finished product one side of the card is covered by the section of carrier material 25c. In this way, the information visible from this side is concealed and only accessible after breaking out the card. This also applies in the case of the embodiment according to FIG. 13 with covering 32, provided that the latter is opaque.

The processes described with reference to FIGS. 11–17 for producing a card which can be broken out have the advantage that the sections of material 28, 29 and 38 can be applied to the carrier material 25 on the same side of the latter. Therefore, only a single dispensing unit is required. It is also possible to apply, instead of two separate sections of material 28, 29, a single section of material which covers the regions 26, 27 and the intermediate region lying in between them.

Before the sections of material 28, 29 are applied, printing is applied to the carrier material 25 in the regions 26, 27. In this case, transparent sections of material 28, 29 are used, in order that the print is visible.

In the case of all the exemplary embodiments described, only a single packaged product sample, or only one card, is provided in the carrier material 1, 15, 25. It is, however, quite possible to form simultaneously in the carrier material 1, 15, 25 two or more packaged product samples or cards arranged one next to the other or one over the other.

What is claimed is:

1. A process for producing packaged product samples held on a carrier, comprising the following steps:

preparing two regions on a flat carrier material by forming an opening in at least one of the regions and subsequently covering the regions with a section of material, or by applying sections of material to the carrier material, or by applying a substance making the carrier material impermeable to gases and liquids;

applying a product sample to one of the prepared regions;

placing the two prepared regions one over the other and then joining the two regions to each other completely or in certain regions along a closed joining region surrounding the product sample; and providing a closed line of weakness outside the closed joining region.

2. The process as claimed in claim 1, wherein the two regions are prepared neighboring each other on a same side of the carrier material.

3. The process as claimed in claim 1, wherein the two prepared regions are placed one over the other by folding the carrier material along a line with respect to which the two regions lie symmetrically.

4. The process as claimed in claim 1, wherein the two regions are sealed to each other by an adhesive and/or a stamped connection.

5. The process as claimed in claim 4, wherein a wall section which can be broken out is fixed by means of a line of weakness within the closed joining region, so that the product sample is exposed once this wall section is broken away.

6. The process as claimed in claim 1, wherein the sections of material applied to the carrier material are transparent or opaque and/or bear printing and are sections of film.

7. A packaged product sample produced by the process as claimed in claim 2, wherein the product sample is arranged between sections of material which lie one over the other and are joined to each other around the product sample and which are each applied to one of two sections of a carrier material lying one over the other and joined to each other, on the same side of the carrier material.

8. A process for producing packaged product samples held on a carrier, comprising the following steps:

preparing two regions on a flat carrier material by forming an opening in at least one of the regions and subsequently covering the regions by applying a section of material to a first side of the carrier material;

turning the carrier material to another side of the carrier material;

applying the product sample to one section of material in the region of an assigned opening from the other side of the carrier material; and placing the two prepared regions one over the other and then joining the two regions to each other completely or in certain regions along a closed joining region surrounding the product sample.

9. The process as claimed in claim 8, wherein the two regions are sealed to each other by an adhesive and/or a stamped connection.

10. A process for producing cards held on a carrier comprising the following steps:

a) preparing two regions on a flat carrier material by applying sections of material to the carrier material;

b) placing the two prepared regions one over the other in such a way that the sections of material come to lie on the outside, and sections of the carrier material lying one over the other are joined to each other, and c) producing a closed line of weakness in the region of the sections of material to define a card which can be broken out.

11. The process as claimed in claim 10, wherein the two regions are prepared neighboring each other on a same side of the carrier material.

12. The process as claimed in claim 10, wherein the two prepared regions are placed one over the other by folding the carrier material along a line with respect to which the two regions lie symmetrically.

13. The process as claimed in claim 10, further comprising applying a covering, which covers one of the two sections of material and is releasably joined to said section, and which is not passed through by the line of weakness, to the carrier material.

14. The process as claimed in claim 10, wherein one section of the carrier material is placed over one of the two sections of material and the one section of carrier material is joined firmly to the remaining carrier material and releasably to the covered section of material, the line of weakness being provided in such a way that it does not pass through the one section of carrier material.

15. The process as claimed in claim 10, further comprising preparing a further region on a further section of the carrier material by applying a section of material, and positioning said further region in between the two other sections of material substantially congruently with them.

16. The process as claimed in claim 15, wherein the section of material applied to the further section of the carrier material is a data carrier.

17. The process as claimed in claim 10, wherein the sections of material applied to the carrier material are transparent or opaque and/or bear printing and are sections of film.

18. The process as claimed in claim 10, wherein the line of weakness is a perforated line.

19. The process as claimed in claim 10, wherein the line of weakness is a cut line.

20. The process as claimed in claim 10, wherein the line of weakness is a punched line.

21. A card held on a carrier produced by the process as claimed in claim 10, wherein the sections of material are attached on the outer sides of two sections of the carrier material lying one over the other and joined to each other, the sections of material being aligned with each other.

22. The card as claimed in claim 21, wherein between the two sections of carrier material lying one over the other there is arranged a further section of material, which is aligned with the two other sections of material.

23. The card as claimed in claim 22, wherein the further section of material is attached to a further section of the carrier material, which is arranged between the two other sections of carrier material.

24. The card as claimed in claim 22, wherein the further section of material is a data carrier.

* * * * *